United States Patent [19]

Billman et al.

[11] 3,764,220

[45] Oct. 9, 1973

[54] ALIGNMENT APPARATUS USING A LASER HAVING A GRAVITATIONALLY SENSITIVE CAVITY REFLECTOR

[75] Inventor: Kenneth W. Billman, Mountain View, Calif.; Eugene T. Leonard, Quincy, Mass.

[73] Assignee: The United States of America as represented by the Administrator of the National Aeronautics and Space Administration

[22] Filed: July 30, 1971

[21] Appl. No.: 167,719

[52] U.S. Cl............ 356/153, 356/138, 331/94.5 A, 356/148, 356/172, 350/285
[51] Int. Cl........................ G01b 11/26, H01s 3/10
[58] Field of Search................. 356/138, 153, 148, 356/172, 285; 331/94.5; 350/310

[56] References Cited
UNITED STATES PATENTS

| | | | |
|---|---|---|---|
| 3,635,565 | 1/1972 | Colson | 356/172 X |
| 2,384,666 | 9/1945 | Wood | 356/148 |
| 3,371,287 | 2/1968 | Haddad | 331/94.5 |
| 3,533,700 | 10/1970 | Alexander | 356/172 |
| 3,471,234 | 10/1969 | Studebaker | 331/94.5 |
| 3,153,689 | 10/1964 | Vargady | 350/285 |

OTHER PUBLICATIONS

Birnbaum & Stocker, "Laser Operation with Liquid Semiconductor Mirrors", IEEE J. of Quantum Electronics, Vol. QE-2, No. 9, 9/66 p. 632–635.

Primary Examiner—Ronald L. Wibert
Assistant Examiner—Paul K. Godwin
Attorney—Darrell G. Brekke et al.

[57] ABSTRACT

A device for determining a true gravitational vertical including a vertically disposed laser having a gravitationally sensitive lower regeneration reflector which enables an output beam to be developed only when the optical axis of the laser is disposed normal to the gravitationally sensitive reflective surface. In an alternative embodiment, the device is combined with a servo system to provide a gravitationally stabilized horizontal platform.

7 Claims, 8 Drawing Figures

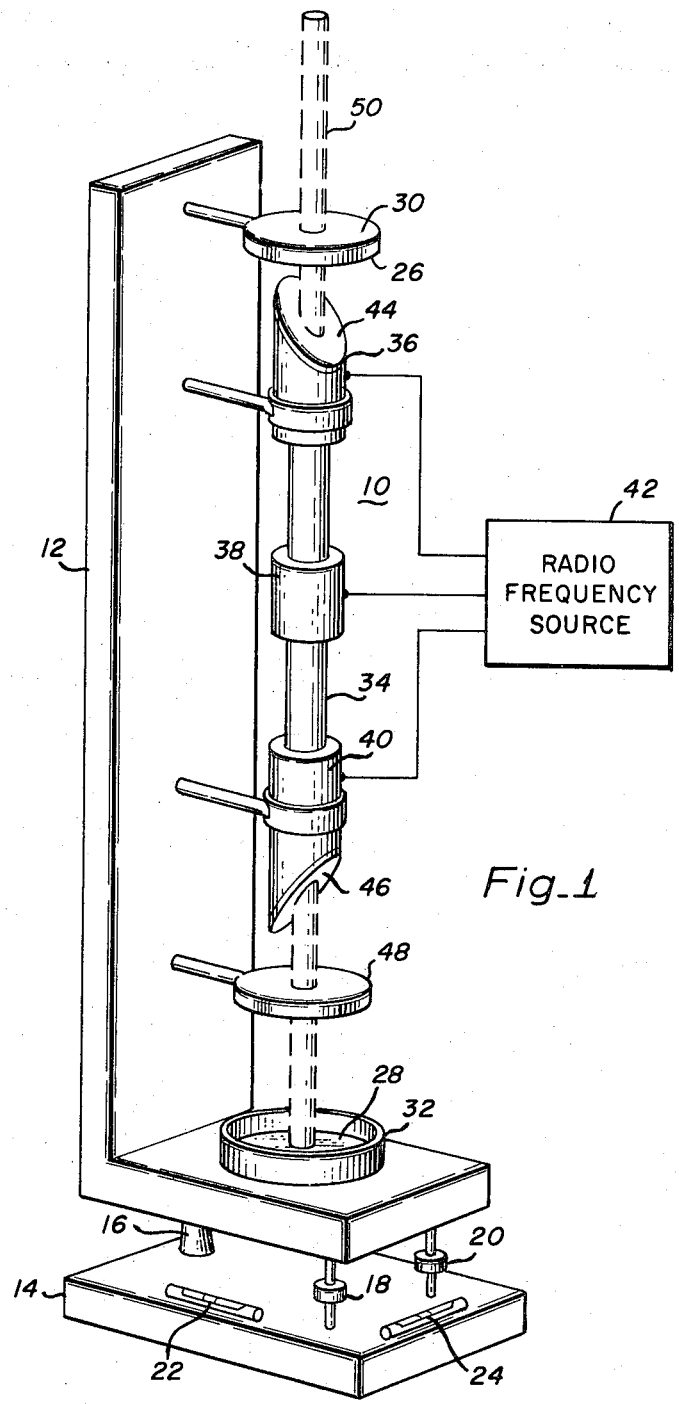
Fig_1

PATENTED OCT 9 1973 3,764,220
SHEET 2 OF 3
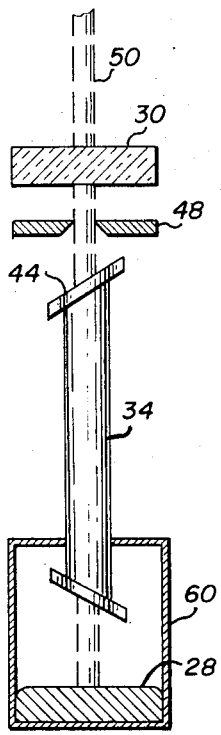
Fig_2
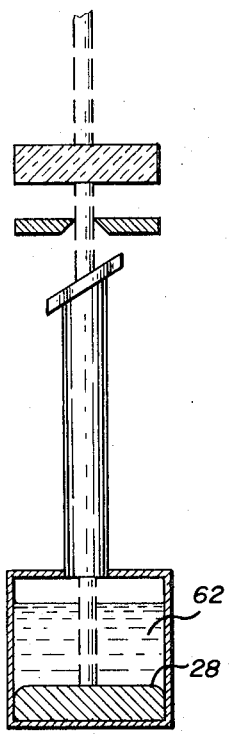
Fig_3
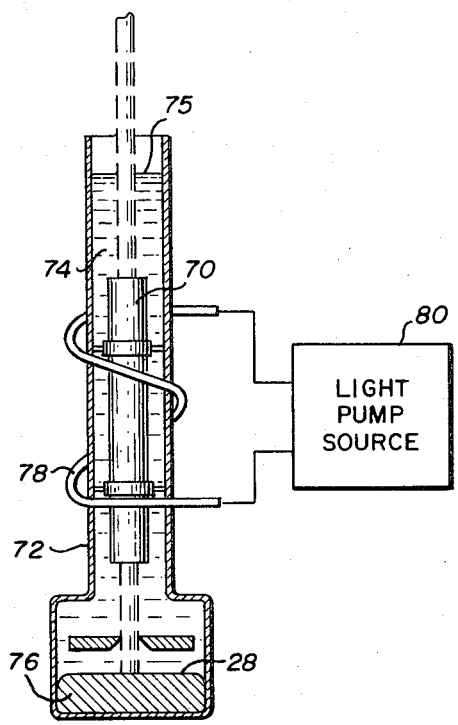
Fig_4
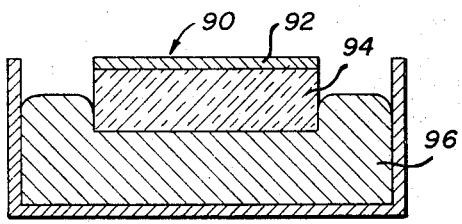
Fig_5
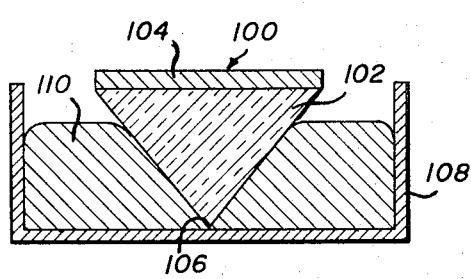
Fig_6
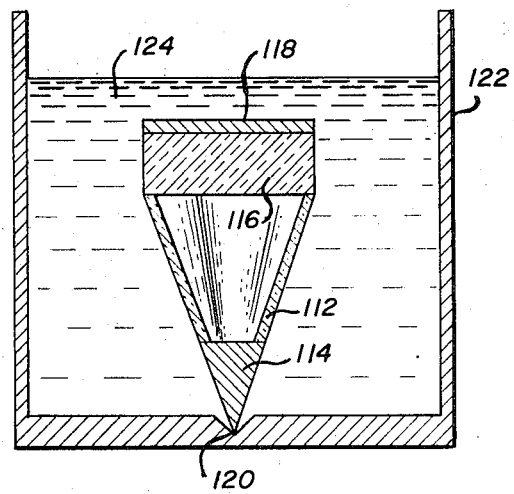
Fig_7
INVENTORS
KENNETH W. BILLMAN
BY EUGENE T. LEONARD
ATTORNEY

ALIGNMENT APPARATUS USING A LASER HAVING A GRAVITATIONALLY SENSITIVE CAVITY REFLECTOR

The invention described herein was made by employees of the United States Government and may be manufactured and used by or for the Government for governmental purposes without the payment for the Government for governmental purposes without the payment of any royalties thereon or therefor.

BACKGROUND OF THE INVENTION

1. Field of the Invention

The present invention relates generally to precision alignment systems and, more particularly, to a vertical alignment apparatus using a laser disposed vertically with respect to the earth's surface and having one of its cavity reflectors gravitationally oriented so that its reflective surface is always horizontally disposed thereby causing laser output beams to be coincident with a true gravitational vertical.

2. Description of the Prior Art

The collimated beam of the laser is ideal for a number of surveying and construction alignment applications. One laser operating continuously can replace two men and a transit. Giant earth-bearing machines are now aligned through the use of the laser. Bulldozers clearing land, graders leveling land, barges and dredges working on dredging harbors or setting piers, pipe layers and ditch diggers are all making use of the laser as a simple method of alignment. One of the most successful applications of the laser has been in the precisional alignment of large structures, such as air frames, accelerators, pipe lines and machinery. In general, straight line propagation, a small divergence and occasionally the coherence properties of this source have been utilized. Examples of laser use in leveling and alignment applications are disclosed in the U.S. Pat. to R. A. Blesch et al. No. 3,520,621 and J. M. Birch et al. No. 3,528,748. However, the inherent properties of a laser have not heretofore been combined with the gravitational characteristics of a liquid to provide a simple means for establishing a true gravitational vertical.

SUMMARY OF THE INVENTION

It is therefore a primary object of the present invention to provide a laser apparatus capable of establishing a true gravitational vertical.

Another object of the present invention is to provide a vertical alignment apparatus utilizing a gravitationally oriented reflective surface as one of the regenerative optical cavity defining means of a vertically disposed laser.

Still another object is to provide a means for developing a true vertical reference which can be used to control a stable, horizontal platform.

Briefly, the present invention relates to the use of a laser as a means of establishing a vertical reference with respect to the earth's gravitational field at a particular location. A lasing element is disposed vertically, and a gravitationally oriented reflective surface is utilized as one of the regenerative reflective surfaces defining the optical cavity so that lasing occurs only when the optical axis of the laser is disposed conicident with a true gravitational vertical.

One of the primary advantages of the present invention is that it provides a highly accurate and convenient means of establishing a vertical alignment guidelines useful in the construction of tall structures, or in the measurement of wind or earthquake deflection of tall structures.

Another advantage of the present invention is that the device is self-aligning in the sense that no laser beam is developed unless the optical axis of the laser is disposed along a true gravitational vertical.

Still another advantage of the present invention is that it provides an accurate datum line to which other lines or planes may be referenced.

Other objects and advantages of the present invention will no doubt become apparent to those skilled in the art after having read the following detailed description of the preferred embodiments illustrated in the several figures of the drawings.

IN THE DRAWINGS

FIG. 1 is a schematic diagram generally illustrating a simplified vertical alignment apparatus in accordance with the present invention.

FIGS. 2, 3 and 4 illustrate modifications which may be made to the vertical alignment apparatus illustrated in FIG. 1. FIGS. 5 trhough 7 illustrate alternative embodiments of gravitationally sensitive mirrors for use in accordance with the present invention.

DETAILED DESCRIPTION OF THE PREFERRED EMBODIMENT

Figure 8:
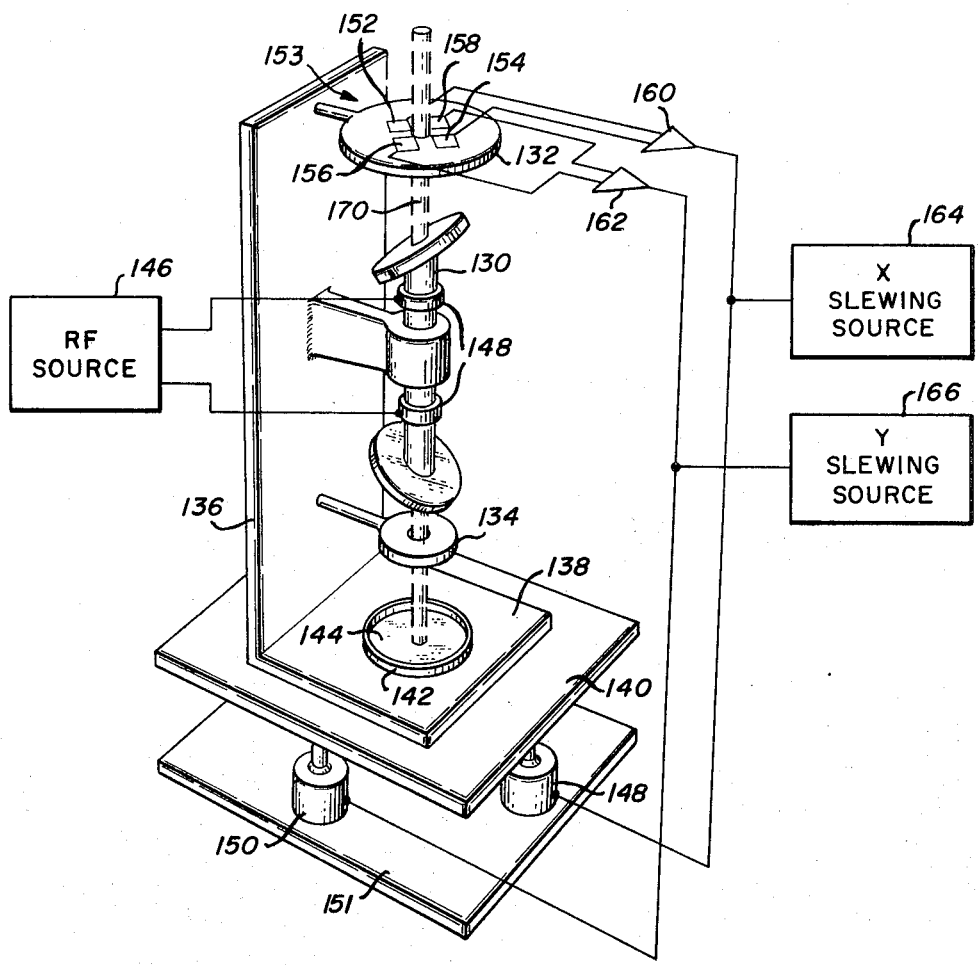
FIG. 8 is a schematic diagram illustrating use of the present invention as a means for establishing a stable, horizontal platform.

Referring now to FIG. 1 of the drawings, a vertical alignment system is illustrated including a laser element 10 mounted to a vertical supporting structure 12 which is itself supported above a base 14 by a pivot 16 and two vertically adjustable legs 18 and 20. Base 14 may also include bubble levels 22 and 24 or other suitable means for enabling rough horizontal alignment of base 14. Once base 14 is rough leveled, legs 18 and 20 are used to provide a fine adjustment of support 12 and thus laser element 10. Regenerative means in the form of reflective mirrors 26 and 28 are disposed at either end of laser element 10, and serve to define an optical cavity. Mirror 26 is provided by the lower surface of a partially transparent lens 30, which may for example, be of a planoconvex configuration. The required reflectivity of mirror 26 is determined by the gain of laser element 10. In some cases, mirror 26 can be eliminated entirely. Mirror 28 is formed by the upper surface of a quantity of mercury disposed in a suitable container such as the Petrie dish 32. Laser element 10 may be comprised of any suitable lasing medium including solid state lasers, liquid lasers, semiconductive lasers and gas lasers. Examples of lasing devices are disclosed in the U.S. Pat. to J. A. Soules et al. No. 3,379,998, J. H. Boyden No. 3,423,695, R. V. Langmuir No. 3,378,686, J. Goldsmith et al. No. 3,351,870. The illustrated laser element 10 is a gas laser and includes a suitable transparent gas container such as the ceramic or quartz tube 34.

In the preferred embodiment, tube 34 was of 3mm bore and 19cm length and was filled with dry nitrogen gas at a pressure of 10 torr, but may alternatively be filled with gases such as helium, neon, argon crypton and other well-known lasing mediums. Disposed about tube 34 are three spaced apart electrodes 36, 38 and 40 and which are electrically energized by the radio frequency source 42 to provide electron collision pumping of laser element 10. Brester windows 44 and 46 are typical of the devices utilized at each end of tube 34 in accordance with well-known techniques to minimize reflection losses. An apertured plate or an adjustable iris 48 is positioned between Brewster window 46 and mirror surface 28 to serve as a means for defining the cross-sectional dimension of the laser beam 50 developed by the apparatus. The separation between lower Brewster window 46 and iris 48 was 2cm in the preferred embodiment, and the iris to mercury separation was 25cm.

In conducting experiments with apparatus of the type illustrated, it was found that mercury vibrations caused beam 50 to randomly sweep through a cone of angles about the true vertical. Therefore, in order to reduce the beam deviation, a simple isolation system comprised of a heavy steel block and a foam rubber pad (not shown) was utilized to damp out vibration. Other vibration damping mechanisms can, of course, be utilized.

In operation, base 14 is rough leveled using bubble levels 22 and 24 and radio frequency source 42 is actuated to energize electrodes 36, 38 and 40. This causes electrical discharges to occur in the gas contained within tube 34 which lose energy through collisions with gas atoms or molecules of the gas, and the atoms and molecules that receive energy are excited. It will be appreciated that, since the mercury surface 28 will, because of gravitational forces, be maintained horizontal, light reflected normal thereto will be directed along a true gravitational vertical. Since the cavity losses in a laser of the type illustrated are high unless the mirror planes are accurately parallel, lasing will only occur when the output mirror 26 and the mercury surface 28 have a common normal which simultaneously coincides with the laser axis and a true gravitational vertical. Thus, by simply adjusting the vertical disposition of support 12 and corresponding tube 34 until an output beam is obtained, the true vertical can be determined and indicated by the output laser beam. Except for second order effects, the beam 50 generated by laser 10 is automatically aligned with the local gravitational field and hence can be used as an electro-optical plumb line for precision alignment of vertical structures.

In practice, the device is particularly useful in the vertical alignment of tall structures such as high-rise buildings or towers. Using a visible wavelength laser positioned at the base of such structures, the vertical erection of the structural members can be insured by simply observing the laser beam on a horizontal target moved along the members as each is fastened into position. More sophisticated techniques such as those used in the laser alignment of the three kilometer Stanford Linear Accelerator could also be used to determine alignment with the generated vertical laser beam. In the stanford Linear Accelerator, a lens is used to focus the beam onto the plane of a detector and the resulting image is photoelectrically scanned. Using such a technique, a displacement sensitivity of 0.0025mm is achieved at any of the detected positions along the 3km path. Similar results can be obtained in accordance with the present invention. It should also be noted that the motion of tall structures due to wind loads or earthquakes can likewise be easily measured by observing the change in position of the laser beam on a target fixed at the top of the structure.

Although mercury offers many simplifying advantages in the disclosed system, its use as a gravitationally sensitive mirror is not always convenient. For example, since mercury has a vapor pressure of $1.86 \times 10^{-4}$ torr at 20°C it is necessary that means be provided to avoid mercury contamination of the lasing medium. To avoid contamination in an argon laser, the configuration illustrated in FIG. 2 was utilized. In this case, a hermetically sealed container 60 is provided enclosing the end of tube 34 and mercury mirror 28. Note that in order to allow simple adjustment of the diameter of laser beam 50, iris 48 has been positioned at the top of tube 34 between lens 30 and Brewster window 44. As an alternative, lower vapor pressure elements such as molten gallium, indium or tin could be used to avoid this problem.

Another alternative is to overlay the mercury with an index matched viscous fluid such as silicon pump oil 62, or the like, as shown in FIG. 3. In addition to silicon pump oil, glycerol or mineral oil may be used. These liquids provide the further advantage of damping out surface ripples in mirror surface 28 due to vibration.

A further modification is illustrated in FIG. 4 wherein a solid laser rod 70 is mounted within a container 72 and totally emersed in an index matched fluid 74 disposed above the mercury layer 76 forming the reflective surface 28. Laser rod 70 is optically pumped by means of the flash lamp 78 spirally wound which is powered from a suitable light pump source 80. As in the previous modification, fluid 74 serves to reduce the sensitivity of the device to vibration. The Fresnel reflection at the upper surface 75 of liquid 74 serves as the output mirror for the cavity.

Since the reflectivity of mercury is only about 76 percent at many of the common low gain laser media wavelengths, its use is restricted to pulsed laser operation where the gains are sufficiently higher to overcome this cavity loss, and moreover, since the plane surface of the mercury is not impervious to high intensities and will undoubtedly be distorted when used with a vertical high intensity ruby or neodymium glass system, it is in many instances more appropriate to utilize a floating mirror in place of the mercury surface as the regenerating medium.

Alternative mirror configurations which are gravitationally sensitive but do not suffer from the aforementioned disadvantages are shown in FIGS. 5, 6 and 7. In FIG. 5, a dielectric coated mirror 90 is shown comprised of dielectric reflective coating 92 on a glass substrate 94 which is floated in a suitable liquid 96 capable of supporting the mirror, and preferably having a high viscosity so as to provide vibration damping. In order that the mirror normal be directed along the true vertical, it is essential that mirror 90 be of uniform density and that it have a zero wedge angle.

A somewhat more stable configuration is shown in FIG. 6. In this case, the mirror 100 is formed of a conically shaped glass member 102 having a reflective coating 104 on its top side. The apex 106 of member 102 bears against the bottom of container 108 and pivots about its point with the buoyant force of liquid 110 serving to maintain the reflective surface 104 horizontal.

Still another alternative embodiment which also damps out mirror oscillations is shown in FIG. 7 and includes an air filled cone 112 having a weighted (brass) tip 114. Cone 112 serves as a support for the glass substrate 116 which is provided with a dielectric mirror coating 118 on its upper surface. Tip 114 is received with a conically shaped depression 120 in the base of container 122. By suitable choice of the damping liquid 124 into which the mirror device is immersed, almost any degree of damping can be achieved. A glycerol and water solution, for example, has been found suitable. For some cases where a Q-switched or mode-locked output is desired from the laser, the surrounding liquid medium 124 can also contain the necessary bleachable dye. Alternatively, a thin layer dye can be floated on top of the damping medium 124.

A gravitationally sensitive laser cavity of the type described above can also be used as a control source for leveling and maintaining level the platform upon which it rests. Perhaps the simplest technique utilizes the "plane-parallel" mirror configuration in which defraction losses terminate lasing whenever the planar output mirror is not parallel to the mercury surface to within a few wavelengths of laser light divided by the mirror spacing. Such a misalignment tolerance would typically be a few microradians. Where the laser is supported in a mount which allows rotation about a normal to its support table, leveling of the table to this accuracy would be indicated by continued lasing for a complete 360° rotation.

A system more adaptable to servo stabilization of a platform is shown in FIG. 8 of the drawings. In such an embodiment, a laser cavity is chosen so that for small angular motions the laser intensity does not vary substantially. Either hemispherical cavity, or a system — such as the pulsed $N_2$ discharge devices disclosed above — which lases without an output mirror can be used. The laser output beam is then invariant in position and intensity so that as the table and the quadrant detector affixed to it rotate about any axis lying in the plane of the table, error signals are obtained which can be used to servo drive the table back to its null position.

In the illustrated embodiment, the laser 130, output mirror 132 and iris 134 are mounted to the vertical support member 136, with the longitudinal axis of symmetry of laser 130 being disposed normal to a stabilized platform 140 and the reflective surface plane of mirror 132. The base 138 of support member 136 is positioned on top of stabilized platform 140, and the dish 142 containing the mercury or other gravity responsive reflecting medium 144 is positioned on top of base 138. Laser 130 is pumped by the application of radio frequency energy from the source 146 to two or more electrodes 148. Platform 140 is supported by a fixed pivot or fulcrum (not shown) and two precision leveling devices 148 and 150 which are mounted to an unstabilized platform 151. The fulcrum is positioned opposite leveling devices 148 and 150 so that energization of device 148 will cause rotation of platform 140 about an X-axis, while energization of device 150 will cause rotation of platform 140 about a Y-axis.

Mounted to the top surface of mirror 132, and disposed about the optical axis of laser 130, is a quadrant detector 153 including four photodetectors 152, 154, 156 and 158. The output signals developed by photodetectors 152 and 154 are amplified by a suitable servo amplifier 160 and applied to the leveling device 148. Similarly, the output signals developed by photodetectors 156 and 158 are amplified by a servo amplifier 162 and applied to the leveling device 150. In order to provide initial leveling of platform 140, an X-axis slewing source 164 and Y-axis slewing source 116 may also be provided. It will be appreciated that, in accordance with this embodiment, once platform 140 is leveled such that mirror 144 causes laser 130 to generate a laser beam 170 the servo control system will maintain platform 140 level with a high degree of precision, providing base 151 is not dislodged beyond the tolerances of the servo system. Practical application of such a system might include stabilization of laboratory platforms in airplanes, ships or other unstable bodies located within a gravitational field sufficient to influence a reflective surface.

Although the present invention has been described with respect to certain simplified schematic embodiments, many additional alterations and modifications are contemplated. For example, the use of a hemispherical cavity utilizing a meniscus lens with a high reflectivity dielectric coating as the output mirror will provide a high cavity Q, less need for critical alignment of the mirror, and a minimum of Gaussian beam size. Thus, using a convex collimating lens, the divergence should approach that characteristic of ordinary gas lasers. Using sophisticated techniques, it is reasonable that tall structures can be aligned along a true vertical line within a few microns, or their motions relative to this line detected with the same accuracy. Replacing the mercury with a gravitationally sensitive dielectric mirror will, of course, allow actual CW lasing with HeNe, argon and other desirable visible wavelength lasers which allow simple visual readout when less accuracy is necessary. It is therefore to be understood that the above described embodiments are for purposes of illustration only and are in no way intended to be limiting. Accordingly, it is intended that the appended claims be interpreted as covering all such modifications as fall within the true spirit and scope of the invention.

What is claimed is:

1. Alignment apparatus for establishing a true vertical reference in a gravitational field, comprising:
    a laser comprising a lasing element having first and second ends, a pumping source, and first and second mirrors dispersed adjacent said first and second ends, respectively, said first and second mirrors defining an optically resonant cavity;
    said mirror having a reflective surface which is oriented by said gravitational field to maintain a horizontal disposition, said second mirror including a pool of liquid material having a surface reflectivity sufficient to enable lasing; and
    means for positioning said first mirror parallel to said horizontal reflective surface whereby a vertical laser beam occurs.

2. Alignment apparatus for establishing a true vertical reference in a gravitational field, comprising:
    a laser comprising a lasing element having first and second ends, a pumping source, and first and second mirrors disposed adjacent said first and second ends, respectively, said first and second mirrors defining an optically resonant cavity;
    said second mirror having a reflective surface which is oriented by said gravitational field to maintain a horizontal disposition;
    a body of liquid, said second mirror being buoyantly supported by said liquid; and
    means for positioning said first mirror parallel to said horizontal reflective surface whereby a vertical laser beam occurs.

3. Alignment apparatus for establishing a true vertical reference in a gravitational field, comprising:
a laser comprising a lasing element having first and second ends, a pumping source, and first and second mirrors disposed adjacent said first and second ends, respectively, said first and second mirros defining an optically resonant cavity;
said second mirror having a reflective surface which is oriented by said gravitational field to maintain a horizontal disposition;
a body of liquid, said liquid being held within a container, said second mirror being attached to a support having a pointed base that rests on the floor of said container, said mirror and said support being immersed under said liquid; and
means for positioning said first mirror parallel to said horizontal reflective surface whereby a vertical laser beam occurs.

4. Alignment apparatus for establishing a true vertical reference in a gravitational field, comprising:
a laser comprising a lasing element having first and second mirrors disposed adjacent said first and second ends, respectively, said first and second mirrors defining an optically resonant cavity;
said second mirror having a reflective surface which is oriented by said gravitational field to maintain a horizontal disposition, said second mirror being damped with a highly viscous fluid; and means for positioning said first mirror parallel to said horizontal reflective surface whereby a vertical laser beam occurs.

5. Alignment apparatus for establishing a true vertical reference in a gravitational field, comprising:
a laser comprising a lasing element having first and second ends, a pumping source, and first and second mirrors disposed adjacent said first and second ends, respectively, said first and second mirrors defining an optically resonsant cavity;
said second mirror having a reflective surface which is oriented by said gravitational field to maintain a horizontal disposition;
a body of liquid, said second mirror being attached to a support which is partially immersed in said liquid; and
means for positioning said first mirror parallel to said horizontal reflective surface whereby a vertical laser beam occurs.

6. Alignment apparatus as claimed in claim 3 wherein said liquid is impregnated with a dye.

7. Alignment apparatus for establishing a true vertical reference, comprising:
a laser comprising a lasing element having first and second ends, a pumping source, and first and second mirrors disposed adjacent said first and second ends, respectively, said first and second mirrors defining an optically resonant cavity;
a body of liquid;
a container for holding said liquid;
said second mirror being attached to a base, said base being partially immersed in and supported by said liquid whereby said second mirror is maintained horizontal; and
means for positioning said mirror parallel to said second mirror whereby a vertical laser beam occurs.

* * * * *